United States Patent
Jeong

(10) Patent No.: US 11,722,951 B2
(45) Date of Patent: Aug. 8, 2023

(54) METHOD AND APPARATUS FOR CHANGING NETWORK CONFIGURATION IN WIRELESS COMMUNICATION SYSTEM

(71) Applicant: Samsung Electronics Co., Ltd., Suwon-si (KR)

(72) Inventor: Sangsoo Jeong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 40 days.

(21) Appl. No.: 17/172,498

(22) Filed: Feb. 10, 2021

(65) Prior Publication Data
US 2021/0258864 A1   Aug. 19, 2021

(30) Foreign Application Priority Data

Feb. 17, 2020 (KR) .................. 10-2020-0019108
Mar. 20, 2020 (KR) .................. 10-2020-0034684

(51) Int. Cl.
*H04W 48/16* (2009.01)
*H04W 76/11* (2018.01)
(Continued)

(52) U.S. Cl.
CPC ............ *H04W 48/16* (2013.01); *H04W 8/08* (2013.01); *H04W 48/18* (2013.01); *H04W 60/04* (2013.01); *H04W 76/11* (2018.02)

(58) Field of Classification Search
CPC ....... G06V 10/25; G06V 40/10; G01J 5/0025; G01J 5/00; G01S 7/40; G01S 13/89; G01S 13/34; G01S 13/68; G01S 13/50; G01S 13/04; G01S 7/415; G01S 813/68; G01S 813/50; G05B 13/0265; G05B 13/02;
(Continued)

(56) References Cited

U.S. PATENT DOCUMENTS 10,791,507 B1 *   9/2020   Mukherjee et al. .. H04W 48/16
11,095,559 B1 *   8/2021   Garvia et al. ......... H04L 45/741
(Continued)

FOREIGN PATENT DOCUMENTS

WO    WO 2019/154476 A1 *   8/2019   ............ H04W 48/18
WO    WO 2021/069057 A1 *   4/2021   ............ H04W 48/18

OTHER PUBLICATIONS

Landis, Bruno et al.; Notification sent with indirect communication in SBA; Nokia Technologies; published on Aug. 6, 2021. (Year: 2021).*

(Continued)

*Primary Examiner* — Meless N Zewdu
(74) *Attorney, Agent, or Firm* — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method and an apparatus for network slicing are provided.

20 Claims, 16 Drawing Sheets

(51) Int. Cl.
*H04W 8/08* (2009.01)
*H04W 48/18* (2009.01)
*H04W 60/04* (2009.01)

(58) Field of Classification Search
CPC ........... G06K 9/00; G06K 9/32; H04W 88/00;
H04W 88/02; H04W 88/08; H04W 88/18;
H04W 16/02; H04W 28/16; H04W 48/16;
H04W 8/08; H04W 60/04; H04W 48/18;
H04W 76/00; H04W 76/10; H04W 76/11;
H04W 88/182; H04W 4/50; H04W 8/02;
H04W 48/20; H04W 60/00; H04L 41/08;
H04L 61/4541; H04L 67/1061; H04L 67/51

See application file for complete search history.

(56) References Cited

U.S. PATENT DOCUMENTS

| | | | |
|---|---|---|---|
| 2017/0303259 A1* | 10/2017 | Lee et al. | H04W 72/048 |
| 2019/0215724 A1* | 7/2019 | Talebi et al. | H04W 28/065 |
| 2019/0230556 A1 | 7/2019 | Lee | |
| 2020/0396678 A1* | 12/2020 | Lee et al. | H04W 48/18 |
| 2021/0120473 A1* | 4/2021 | Yao et al. | H04W 36/30 |
| 2021/0204200 A1* | 7/2021 | Krishan et al. | H04W 48/16 |
| 2021/0250172 A1* | 8/2021 | Choyi et al. | H04L 9/3213 |
| 2022/0295386 A1* | 9/2022 | Lu et al. | H04W 48/16 |

OTHER PUBLICATIONS

3GPP; TSG SA; Procedures for the 5G System (5GS); Stage 2 (Release 16), 3GPP TS 23.502 V16.3.0, sections 4.17.10, 5.2.7.3.2; and figure 4.17.10-1, Dec. 22, 2019.
Oracle, Usage of NF Binding as Discovery and Selection, C3-194247, 3GPP TSG CT WG3 Meeting# 106, Oct. 3, 2019, Portoroz, Slovenia, section 2.1.
3GPP; TSG SA; System architecture for the 5G System (5GS); Stage 2 (Release 16), 3GPP TS 23.501 V16.3.0, sections 6.2.6, 6.2.19, Dec. 22, 2019.
Deutsche Telekom AG et al., Introduction of indirect communication between NF services, and implicit discovery, S2-1901378, 3GPP TSG SA2 Meeting #130, Jan. 29, 2019, Kochi, India, pp. 1-16.
3rd Generation Partnership Project; Technical Specification Group Services and System Aspects; Procedures for the 5G System (5GS); Stage 2 (Release 16), 3GPP TS 23.502, V16.3.0, Dec. 22, 2019, pp. 1-558, XP051840932.
Ericsson, Reselection clarification, 3GPP TSG-SA WG2 Meeting #134, S2-1906969, Jun. 18, 2019, Sapporo, Japan, XP051751949.
Nokia et al, eSBA communication schema Model C, 3GPP TSG-SA WG2 Meeting #130, S2-1901162, Jan. 24, 2019, Kochi, India, XP051595724.
LG Electronics, Clarification related to Subscription data type, 3GPP TSG-SA WG2 Meeting #126, S2-181527, Feb. 13, 2018, Montreal, Canada, XP051408079.
Deutsche Telekom AG? et al, Introduction of indirect communication between NF services, and implicit discovery, 3GPP TSG-SA2 Meeting #131, S2-1901515, Feb. 19, 2019, Santa Cruz, Tenerife, Spain, XP051597550.
International Search Report dated May 6, 2021, issued in International Application No. PCT/KR2021/001815.
European Search Report dated Jun. 30, 2021, issued in European Application No. 21156598.1.

* cited by examiner

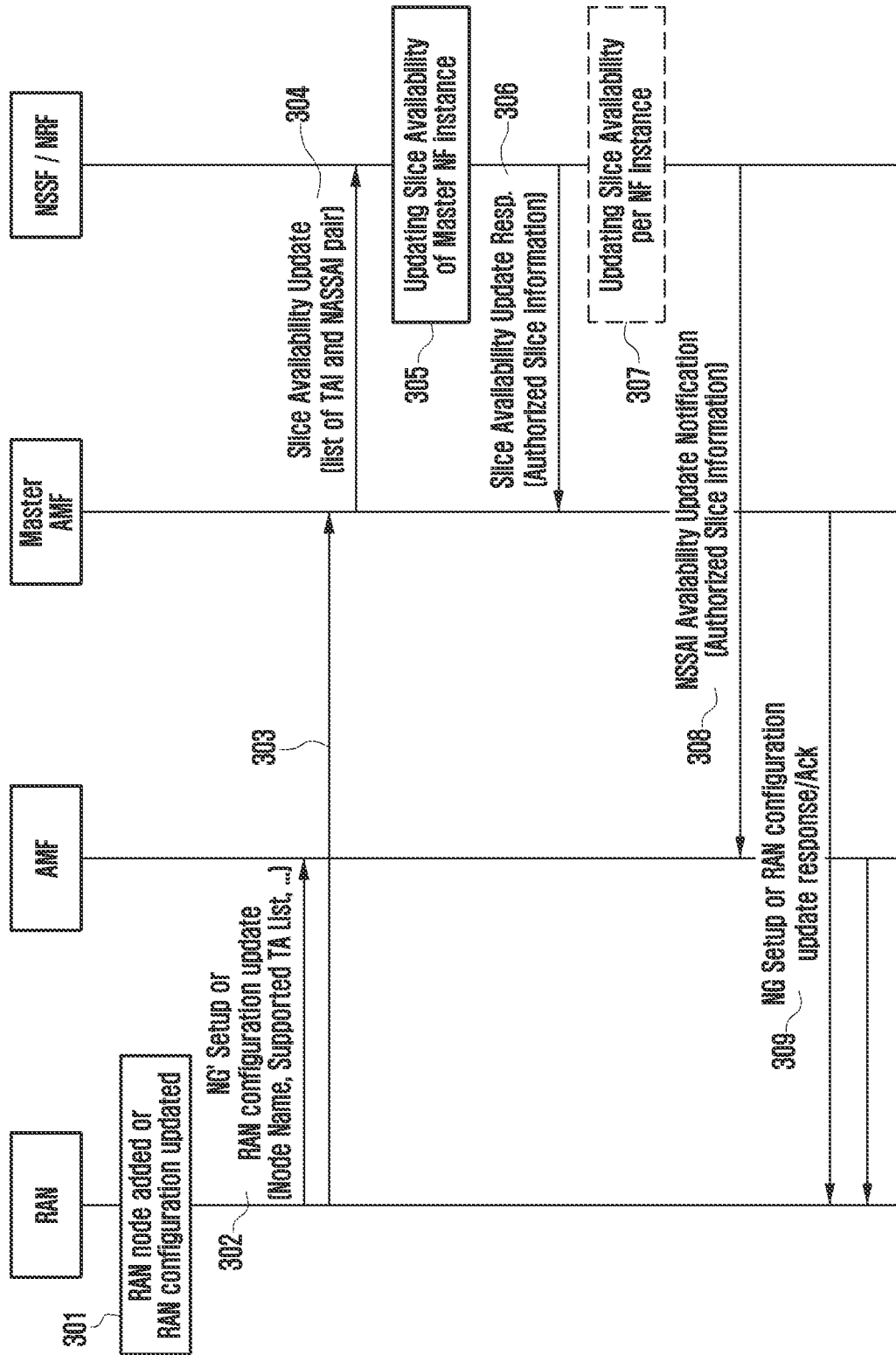

METHOD AND APPARATUS FOR CHANGING NETWORK CONFIGURATION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0019108, filed on Feb. 17, 2020 in the Korean Intellectual Property Office and of a Korean patent application number 10-2020-0034684, filed on Mar. 20, 2020, in the Korean Intellectual Property Office, the disclosure of each of which is incorporated by reference in its entirety.

BACKGROUND

1. Field

The disclosure relates to a method of changing the configuration of a network established in a wireless communication system. More particularly, the disclosure relates to a method of slicing a network in a next-generation wireless communication system.

2. Description of Related Art

To meet the demand for wireless data traffic having increased since deployment of 4$^{th}$ generation (4G) communication systems, efforts have been made to develop an improved 5$^{th}$ generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, machine type communication (MTC), and machine-to-machine (M2M) communication may be implemented by beamforming, MIMO, and array antennas. Application of a cloud radio access network (RAN) as the above-described Big Data processing technology may also be considered to be as an example of convergence between the 5G technology and the IoT technology.

With the development of various information technology (IT) technologies, network equipment has evolved into a virtualized network function (NF, hereinafter, may be used interchangeably with a 'network element') by applying virtualization technology, and virtualized NFs may be implemented in a software form without physical limitations to be installed/operated in various types of clouds or data centers (DCs). In particular, the NF may be freely expanded, scaled, initiated, or terminated according to service requirements, a system capacity, or a network load. It should be noted that even if these NFs are implemented in a software form, the NFs do not exclude physical configurations, because the NFs should be basically driven on a physical configuration, for example, a fixed equipment. Further, NFs may be implemented only with a simple physical configuration, that is, hardware.

In order to support various services in these various network structures, network slicing technology has been introduced. Network slicing is a technology that logically configures a network as a set of network functions (NF) for supporting a specific service and that separates the network from other slices. One terminal may access two or more slices when receiving various services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and apparatus for effectively managing a network configured with network slices for supporting various services and preventing signaling loads and collisions.

Additional aspects will be set forth in part in the description which follows and, in part, will be apparent from the description, or may be learned by practice of the presented embodiments.

In accordance with an aspect of the disclosure, a method performed by a service communication proxy (SCP) entity in a wireless communication system is provided. The method includes transmitting, to a network repository function (NRF) entity, a network function (NF) discovery request message including first information associated with a target SCP entity, and receiving, from the NRF entity, an NF discovery response message including second information associated with the target SCP entity based on the first information, wherein the first information includes a type of NF for the target SCP entity, the type of NF being set to an SCP.

In the method, the first information includes at least one of NF set information associated with an NF entity served by the target SCP entity or a network slice related identifier associated with the target SCP entity.

In the method, the second information includes the type of NF for the target SCP entity, an NF identifier of the target SCP entity, and an address of the target SCP entity.

In the method, the second information includes at least one of a network slice related identifier associated with the target SCP entity, SCP domain information associated with another SCP entity interconnected with the SCP entity, NF set information associated with an NF entity served by the SCP entity, or endpoint addresses accessible via the target SCP entity.

In accordance with another aspect of the disclosure, a service communication proxy (SCP) entity in a wireless communication system is provided. The SCP entity includes a transceiver, and at least one processor coupled with the transceiver and configured to transmit, to a network repository function (NRF) entity, a network function (NF) discovery request message including first information associated with a target SCP entity, and receive, from the NRF entity, an NF discovery response message including second information associated with the target SCP entity based on the first information, wherein the first information includes a type of NF for the target SCP entity, the type of NF being set to an SCP.

In accordance with another aspect of the disclosure, a method performed by a network repository function (NRF) entity in a wireless communication system is provided. The method includes receiving, from a service communication proxy (SCP) entity, a network function (NF) discovery request message including first information associated with a target SCP entity, and transmitting, to the SCP entity, an NF discovery response message including second information associated with the target SCP entity based on the first information, wherein the first information includes a type of NF for the target SCP entity, the type of NF being set to an SCP.

In accordance with another aspect of the disclosure, a network repository function (NRF) entity in a wireless communication system is provided. The NRF entity includes a transceiver, and at least one processor coupled with the transceiver and configured to receive, from a service communication proxy (SCP) entity, a network function (NF) discovery request message including first information associated with a target SCP entity, and transmit, to the SCP entity, an NF discovery response message including second information associated with the target SCP entity based on the first information, wherein the first information includes a type of NF for the target SCP entity, the type of NF being set to an SCP.

According to disclosed embodiments of the disclosure, it is possible to efficiently use radio resources and efficiently provide various services to users by managing network slices in units of sets.

In addition, according to an embodiment of the disclosure, the user can efficiently access a desired network function entity by efficiently searching for a plurality of network function entities providing various services.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 3 is a diagram illustrating a method for more effectively managing network slice selection assistance information (NSSAI) availability according to an embodiment of the disclosure;

The same reference numerals are used to represent the same elements throughout the drawings.

DETAILED DESCRIPTION

Figure 1:
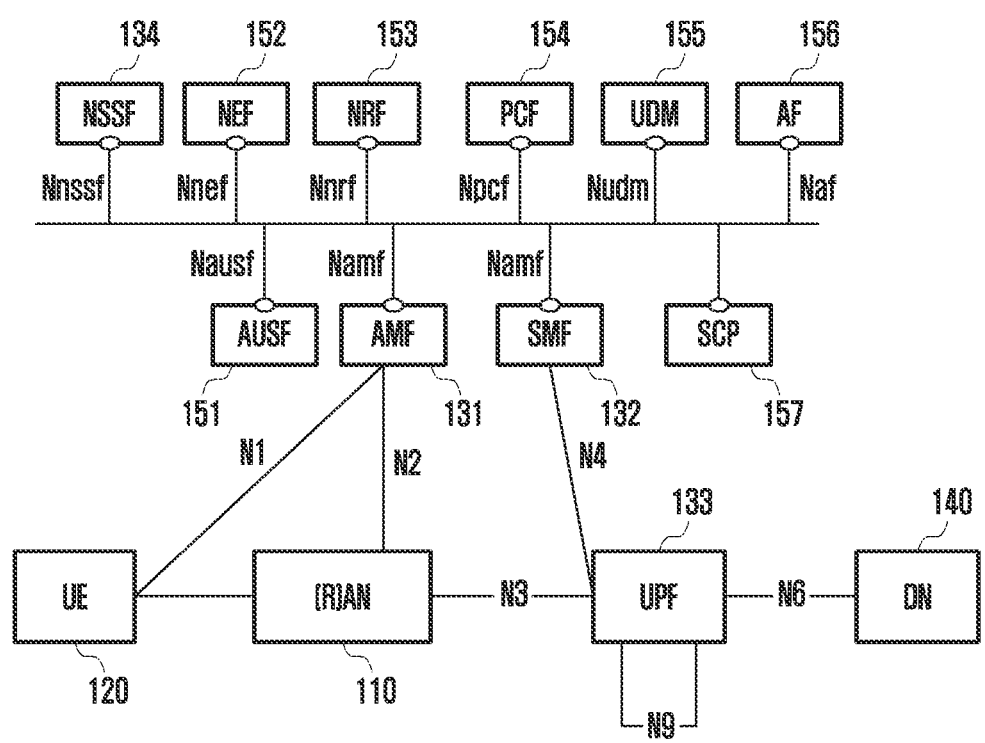
FIG. 1 is a diagram illustrating a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Terms used in the disclosure are used only to describe a specific embodiment of the disclosure, and may be not intended to limit the scope of other embodiments. Terms including technical and scientific terms used herein have the same meaning as commonly understood by one of ordinary skill in the art to which this disclosure belongs. Among the terms used in the disclosure, those defined in commonly used dictionaries may be interpreted as having a meaning that is identical or similar to their meaning in the context of the specification and relevant art and should not be interpreted in an idealized or overly formal sense unless expressly so defined herein. In some cases, even terms defined in the disclosure should not be interpreted to exclude embodiments of the disclosure.

In various embodiments of the disclosure described below, a hardware approach is described as an example. However, as various embodiments of the disclosure include technologies using both hardware and software, various embodiments of the disclosure do not exclude a software-based approach.

Here, the same or similar reference symbols are used throughout the drawings to refer to the same or like parts. Descriptions of functions and structures well known in the art may be omitted to avoid obscuring the subject matter of the disclosure.

In the following description of embodiments of the disclosure, descriptions of technical details well known in the art and not directly related to the disclosure may be omitted. This is to more clearly convey the gist of the disclosure without obscurities by omitting unnecessary descriptions.

Likewise, in the drawings, some elements are exaggerated, omitted, or only outlined in brief. In addition, the size of each element does not necessarily reflect the actual size. The same reference symbols are used throughout the drawings to refer to the same or corresponding parts.

Advantages and features of the disclosure and methods for achieving them will be apparent from the following detailed description of embodiments taken in conjunction with the accompanying drawings. However, the disclosure is not limited to the embodiments disclosed below but may be implemented in various different ways, the embodiments are provided only to complete the disclosure and to fully inform the scope of the disclosure to those skilled in the art to which the disclosure pertains, and the disclosure is defined only by the scope of the claims. The same reference symbols are used throughout the specification to refer to the same parts.

Meanwhile, it will be appreciated that blocks of a flowchart and a combination of flowcharts may be executed by computer program instructions. These computer program instructions may be loaded on a processor of a general purpose computer, special purpose computer, or programmable data processing equipment, and the instructions executed by the processor of a computer or programmable data processing equipment create a means for carrying out functions described in blocks of the flowchart. To implement the functionality in a certain way, the computer program instructions may also be stored in a computer usable or readable memory that is applicable in a specialized computer or a programmable data processing equipment, and it is possible for the computer program instructions stored in a computer usable or readable memory to produce articles of manufacture that contain a means for carrying out functions described in blocks of the flowchart. As the computer program instructions may be loaded on a computer or a programmable data processing equipment, when the computer program instructions are executed as processes having a series of operations on a computer or a programmable data processing equipment, they may provide operations for executing functions described in blocks of the flowchart.

Additionally, each block of a flowchart may correspond to a module, a segment or a code containing one or more executable instructions for executing one or more logical functions, or to a part thereof. It should also be noted that functions described by blocks may be executed in an order different from the listed order in some alternative cases. For example, two blocks listed in sequence may be executed substantially at the same time or executed in reverse order according to the corresponding functionality.

Here, the word "unit", "module", or the like used in the embodiments may refer to a software component or a hardware component, such as a field programmable gate array (FPGA) or application-specific integrated circuit (ASIC) capable of carrying out a function or an operation. However, "unit" or the like is not limited to hardware or software. A unit or the like may be configured so as to reside in an addressable storage medium or to drive one or more processors. For example, units or the like may refer to components, such as a software component, object-oriented software component, class component or task component, processes, functions, attributes, procedures, subroutines, program code segments, drivers, firmware, microcode, circuits, data, databases, data structures, tables, arrays, or variables. A function provided by a component and unit may be a combination of smaller components and units, and it may be combined with others to compose larger components and units. Components and units may be implemented to drive one or more processors in a device or a secure multimedia card.

Hereinafter, the disclosure relates to a method and apparatus for supporting various services in a wireless communication system. Specifically, the disclosure describes a technology for providing various services by supporting mobility of a terminal in a wireless communication system.

Those terms used in the following description for identifying an access node, indicating a network entity or network function (NF), indicating messages, indicating an interface between network entities, and indicating various identification information are taken as illustration for ease of description. Accordingly, the disclosure is not limited by the terms to be described later, and other terms referring to objects having an equivalent technical meaning may be used.

For convenience of description below, the disclosure may use terms and names defined in the 3$^{rd}$ generation partnership project (3GPP) long term evolution (LTE) and 5$^{th}$ generation (5G) standards. However, the disclosure is not limited by the above terms and names, and may be equally applied to systems conforming to other standards.

In the disclosure, entities that exchange information for access control and state management will be collectively described as an NF. For example, the NF may be at least one entity among an access and mobility management function (AMF) entity, a session management function (SMF) entity, and a network slice selection function (NSSF) entity. However, embodiments of the disclosure may be equally applied even when an NF is actually implemented as an instance (e.g., AMF instance, SMF instance, or NSSF instance).

In the disclosure, an instance may indicate a state where a specific NF exists in the form of software code and can be executed on a physical computing system, for example, a specific computing system existing on the core network to perform the function of the NF by using physical or/and logical resources allocated from the computing system. Hence, this may mean that an instance of each NF, such as an AMF instance and an SMF instance may use physical or/and logical resources allocated from a specific computing system existing on the core network for the corresponding NF operation. Consequently, an NF instance, which uses physical or/and logical resources allocated from a specific computing system existing on the network for the NF operation, may perform the same operation as a case where an NF entity, such as a physical AMF or SMF exists.

FIG. 1 illustrates a wireless communication system according to an embodiment of the disclosure.

Referring to FIG. 1, as a node using a radio channel in the wireless communication system, a base station (radio access node (RAN)) 110 and a terminal (user equipment (UE)) 120 are illustrated. Although only one base station 110 and one terminal 120 are shown in FIG. 1, another base station identical or similar to the base station 110 may be further included. Additionally, in FIG. 1, only a case where only one terminal 120 performs communication within one base station 110 is illustrated. However, it is evident that a plurality of terminals can actually communicate within one base station 110.

The base station 110 is a network infrastructure that provides radio access to the terminal 120. The base station 110 has a coverage defined as a certain geographic area based on the distance at which a signal can be transmitted (not shown in FIG. 1). Besides radio access node (RAN), the base station 110 may be referred to as access point (AP), eNodeB (eNB), 5G node, wireless point, transmission/reception point (TRP), or as another term having an equivalent technical meaning.

The terminal 120 is a device used by a user and performs communication with the base station 110 through a radio channel. In some cases, the terminal 120 may be operated without user involvement. For example, the terminal 120 may be a device that performs machine type communication (MTC), and may be not carried by a user. The terminal 120 illustrated in FIG. 1 may include at least one user portable device, and may include at least one MTC device. The terminal 120 in FIG. 1 may be referred to as user equipment (UE), mobile station, subscriber station, remote terminal, wireless terminal, user entity, or as another term having an equivalent technical meaning.

The AMF entity 131 may be a network entity that manages wireless network access and mobility for the terminal 120. The SMF entity 132 may be a network entity that manages a connection to a packet data network for providing packet data to the terminal 120. The connection between the terminal 120 and the SMF 132 may be a PDU session.

The user plane function (UPF) entity 133 may be a gateway that delivers packets transmitted and to be received by the terminal 120 or a network entity serving as a gateway. The UPF 133 may be connected to the data network (DN) 140 connected to the Internet, and may provide a path for transmitting and receiving data between the terminal 120 and the DN 140. Hence, the UPF 133 may route data to be delivered to the Internet among packets transmitted by the terminal 120 to an Internet data network.

The network slice selection function (NSSF) entity 134 may be a network entity that performs a network selection operation described in the disclosure, for example, an operation for selecting a network slice. The operation of the NSSF entity 134 will be described below with reference to the following drawings.

The authentication server function (AUSF) entity 151 may be an equipment (network entity) that provides a service for processing subscriber authentication.

The network exposure function (NEF) entity 152 may be a network entity that can access management information of the terminal 120 on a 5G network, subscribe a mobility management event for the terminal, subscribe a session management event for the terminal, make a request for session-related information, set charging information for the terminal, make a change request for the PDU session policy of the terminal, and transmit small data about the terminal.

The network repository function (NRF) entity 153 may be an NF (network entity) that can store state information of NFs and process a request for finding an NF to which other NFs can make access.

The policy and charging function (PCF) entity 154 may be a network entity that applies a service policy, a charging policy, and a PDU session policy of the mobile network operator to the terminal 120.

The unified data management (UDM) entity 155 may be a network entity that stores information about the subscriber or/and the terminal 120.

The application function (AF) entity 156 may be an NF (network entity) that provides services to users in cooperation with a mobile communication network.

The service communication proxy (SCP) entity 157 is an NF (network entity) that provides functions, such as NF discovery for communication between NFs and message transfer between NFs. The SCP 157 can operate in an integrated form with the NRF 153 according to the operator's selection. In this case, the SCP 157 may include the function of the NRF 153, or, conversely, the NRF 153 may include the function of the SCP 157.

Hereinafter, for ease of description, entities that exchange information for access control and state management will be collectively described as an NF. For example, the NF may be one of NF entities, such as the access and mobility management function (AMF) entity, the session management function (SMF) entity, and the network slice selection function (NSSF) entity. However, embodiments of the disclosure may be equally applied even when an NF is actually implemented as an instance (AMF instance, SMF instance, or NSSF instance).

Figure 2:
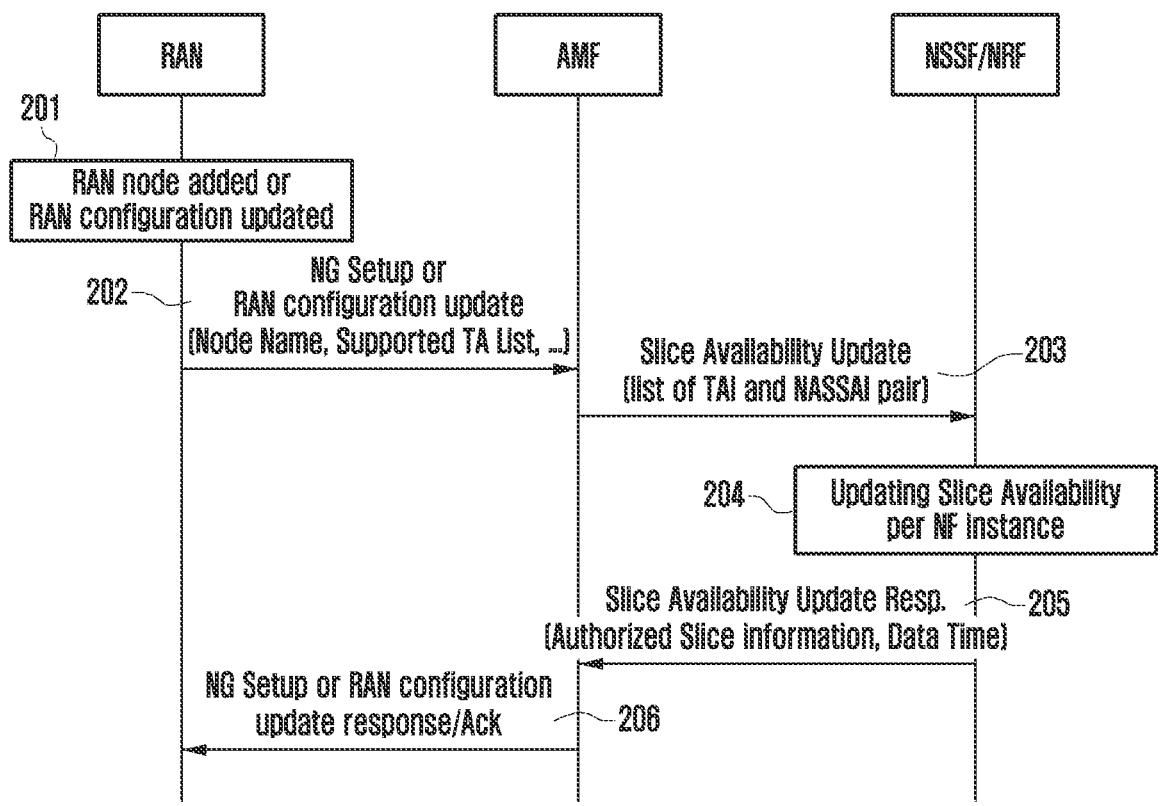
FIG. 2 is a diagram illustrating a method for selecting a network slice when a new base station (RAN) is added or configuration information of a base station is changed in a mobile communication system according to an embodiment of the disclosure.

FIG. 2 is a diagram illustrating a method that, when a new base station (RAN) is added in a mobile communication system or configuration information of a base station (e.g., tracking area (TA) supported by the base station, NW slice (logical network identified by single network slice selection assistance information (S-NSSAI)) is added or updated, can notify this to other NFs and enables a network slice suitable for the subscriber service to be selected accordingly according to an embodiment of the disclosure.

Referring to FIG. 2, a base station may be newly added or may start to operate, or the configuration of the base station, that is, the tracking area (TA) or a NW slice (logical network identified by S-NSSAI) supported by the base station may be added or updated at operation 201.

The base station may perform an NG setup procedure if a new relationship and connection for network configuration and management with the AMF is required, or may perform a RAN configuration update procedure if there is an existing connection at operation 202. Here, the request message sent by the base station may include the name and identifier of the base station and a list of TAs supported by the base station, and the TA list may include, for each TA, one or more S-NSSAIs supported in the TA.

The AMF may determine whether to consider addition or update of network slice and TA information in the slice selection process according to the information received from the base station. If the network configuration for slice selection is updated, the AMF may invoke the NSSF (which can be replaced with another NF like the NRF or SCP that manages and finds network state information) for a service of NSSAI availability update at operation 203. The network slice selection assistance information (NSSAI) may be composed of one or more S-NSSAIs. Similarly, the service request message may include a list of TAIs and NSSAIs to be added or updated.

The NSSF may update or add information about a slice and an area (TA) where the slice is supported if necessary to update it according to the request from the AMF at operation 204. Here, the data stored by the NSSF may be identified by using the identity (ID) of the AMF instance having made the request. The NSSF may determine the time of application for the updated NSSAI availability.

The NSSF transmits a response for the request from the AMF, in which case when the slice information (AuthorizedNssaiAvailability) allowed to be used by the AMF is updated or added, this may also be notified at operation 205. Here, to match the application time of the updated availability with other AMFs, the NSSF may transmit the corresponding time information as a portion of the response to the AMF. Upon receiving the time information, the AMF operates with application of the updated information from the time point when the corresponding time condition is satisfied.

The AMF transmits a response for the request from the base station, in which case configuration information of the AMF may be included in the response at operation 206. If the network configuration supported by the AMF (TA, supported NSSA, PLMN, or the like) is updated at operation 205, the base station is notified through this process.

The disclosure proposes a method that can more effectively manage network slices and prevent signaling loads and collisions in a network configuration composed of NF sets.

In the embodiment of FIG. 2, if two or more AMFs (including instances) are included in one AMF set and that set supports the same TAs and slices, addition or configuration update of a base station must be delivered to all NFs (e.g., AMF) belonging to the set and all NFs receiving this may have to transmit a request to other NSSFs (or NRFs) to notify the addition/update of their NSSAI availability. In this case, if the number of base stations is large or the number of AMFs in the set is large, a signaling overload may occur, or a mismatch or collision may occur in the network configuration information due to a time difference in transmission and processing of signaling.

FIG. 3 illustrates a method for more effectively managing NSSAI availability according to an embodiment of the disclosure.

In this embodiment of the disclosure, NSSAI availability management may be performed by the master AMF (or, default AMF) belonging to the AMF set.

One of the AMFs belonging to the AMF set may be selected as the master AMF. A designated AMF may be set to play the master role, or AMFs may be selected alternately in a round robin fashion to play the master role. Here, information may be exchanged between the AMFs to notify that only one AMF operates as the master in the AMF set at a specific time.

Referring to FIG. 3, a base station may be newly added or may start to operate, or the configuration of the base station, that is, the tracking area (TA) or a NW slice (logical network identified by S-NSSAI) supported by the base station may be added or updated at operation 301.

The base station may perform an NG setup procedure if a new relationship and connection for network configuration and management with the connected AMF and master AMF is required, or may perform a RAN configuration update procedure if there is an existing connection at operations 302, 303. Here, the request message sent by the base station may include the name and identifier of the base station and a list of TAs supported by the base station, and the TA list may include, for each TA, one or more S-NSSAIs supported in the TA.

The master AMF may determine whether to consider addition or update of network slice and TA information in the slice selection process according to the information received from the base station. If the network configuration for slice selection is updated, the master AMF may invoke the NSSF (which can be replaced with another NF like the NRF or SCP that manages and finds network state information) for a service of NSSAI availability update at operation 304. The network slice selection assistance information (NSSAI) may be composed of one or more S-NSSAIs. Similarly, the service request message may include a list of TAIs and NSSAIs to be added or updated.

The NSSF may update or add information about a slice and an area (TA) where the slice is supported if necessary to update it according to the request from the master AMF at operation 305. Here, the data stored by the NSSF may be identified by using the identity (ID) of the master AMF instance having made the request. The NSSF may determine the time of application for the updated NSSAI availability.

The NSSF transmits a response for the request from the master AMF, in which case when the slice information (e.g., AuthorizedNssaiAvailability) allowed to be used by the AMF is updated or added, this may also be notified to the master AMF at operation 306. Here, to match the application time of the updated availability with other AMFs, the NSSF may transmit the corresponding time information as a portion of the response to the master AMF. Upon receiving the time information, the master AMF operates with application of the updated information from the time point when the corresponding time condition is satisfied.

The NSSF may also update the NSSAI available information of other AMF instances belonging to the AMF set requested from the master AMF at operation 307. For example, the NSSF may find an AMF set related to the slice information received from the master AMF, find AMF instances belonging to the set, and update the NSSAI available information identified by the instance IDs of the AMF instances together.

If the NSSAI availability information is updated for other AMF instances belonging to the AMF set and AuthorizedNssaiAvailability is updated or added for each AMF instance, the NSSF may transmit a message notifying this to each AMF instance at operation 308. This can be performed by using the NSSAI availability update notification service. Here, to match the application time of the updated availability with other AMF instances, the NSSF may transmit the corresponding time information as a portion of the message to the AMF. Upon receiving the time information, the AMF operates with application of the updated information from the time point when the corresponding time condition is satisfied.

The AMFs transmit a response for the request message from the base station, in which case configuration information of the AMF may be included in the response at operation 309. If the network configuration supported by the AMF (TA, supported NSSA, PLMN, or the like) is updated in the NSSF, the AMF may notify this to the base station through the response message.

TABLE 1-continued

| Attribute name | P | Cardinality | Description |
| --- | --- | --- | --- |
| nfStatus | M | 1 | Status of NF set (idle, active, or the like) |
| nfSetName | O | 0 . . . 1 | Human-readable name of NF set |
| plmnList | C | 0 . . . N | List of PLMN IDs commonly supported by NF set |
| snpnList | C | 0 . . . N | SNPN(s) supported by NF set |
| sNssais | O | 0 . . . N | S-NSSAIs supported by NF set |
| perPlmnSnssaiList | O | 0 . . . N | S-NSSAIs supported by NF set for each PLMN |
| . . . | | | |

Likewise, information on available slices (NSSAI availability) can be shared and managed per set. In this case, the unit for storing/managing the slice information in the NF is not the ID of each AMF but the AMF set ID or the ID of the NF that manages information for each set. For example, the resource for which the NSSF stores corresponding information is managed per set, and may be identified by an AMF set ID or an ID of the NF that manages information for each set.

NSSAI availability information per set (NSSAI availability per set) may be composed of the following data shown in Table 2.

TABLE 2

| Attribute name | Data type | P | Cardinality | Description |
| --- | --- | --- | --- | --- |
| supportedNssaiAvailabilityData | array(SupportedNssaiAvailabilityData) | M | 1 . . . N | This IE shall contain the information regarding the S-NSSAIs, the NF set (e.g., AMF set) and the 5G-AN supports TA. |
| supportedFeatures | SupportedFeatures | C | 0 . . . 1 | This IE shall be present if at least one optional feature defined in clause 6.2.8 is supported. |
| nfInstanceId | NfInstanceId | O | 0 . . . N | This IE may be included to indicate the NF (e.g., AMF) instances identifier serving the TAIs where the NSSAI is available. |
| amfSetId | string | O | 0 . . . 1 | This IE may be included to indicate the AMF set identifier for the AMFs serving the TAIs where the NSSAI available. When present, this IE shall be constructed from PLMN-ID (i.e., three decimal digits MCC and two or three decimal digits MNC), AMF Region Id (8 bit), and AMF Set Id (10 bit). Pattern:'^[0-9]{3}-[0-9]{2-3}-[A-Fa-f0-9]{2}-[0-3][A-Fa-f0-9]{2}$' |

In addition, to address the above issue, the disclosure proposes a method that defines information shared commonly in a specific NF set separately as an NF set profile and uses this to improve signaling efficiency and match state information.

The NF set profile is stored or managed by using an identifier that can identify the corresponding NF set (NF set ID or ID of the NF instance that manages NF set information). The information shown in Table 1 may be included in the NF set profile, and any type of information shared by NF instances in the NF set (e.g., serving scope: supported area, or the like) may be added.

TABLE 1

| Attribute name | P | Cardinality | Description |
| --- | --- | --- | --- |
| nfSetId | M | 1 | ID that can refer to common profile of Nf set. ID of instance that manages Nf set profile may also be used |
| nfType | M | 1 | Type of NF belonging to NF set (e.g., AMF, SMF, or the like) | supportedNssaiAvailabilityData may be configured as shown in Table 3 below.

TABLE 3

| Attribute name | Data type | P | Cardinality | Description |
| --- | --- | --- | --- | --- |
| tai | Tai | M | 1 . . . N | This IE shall contain the identifier of the Tracking Area. |
| supportedSnssaiList | array (Snssai) | C | 0 . . . 1 | This IE shall contain the S-NSSAI(s) supported by the AMF for the TA. |

Figure 4A:
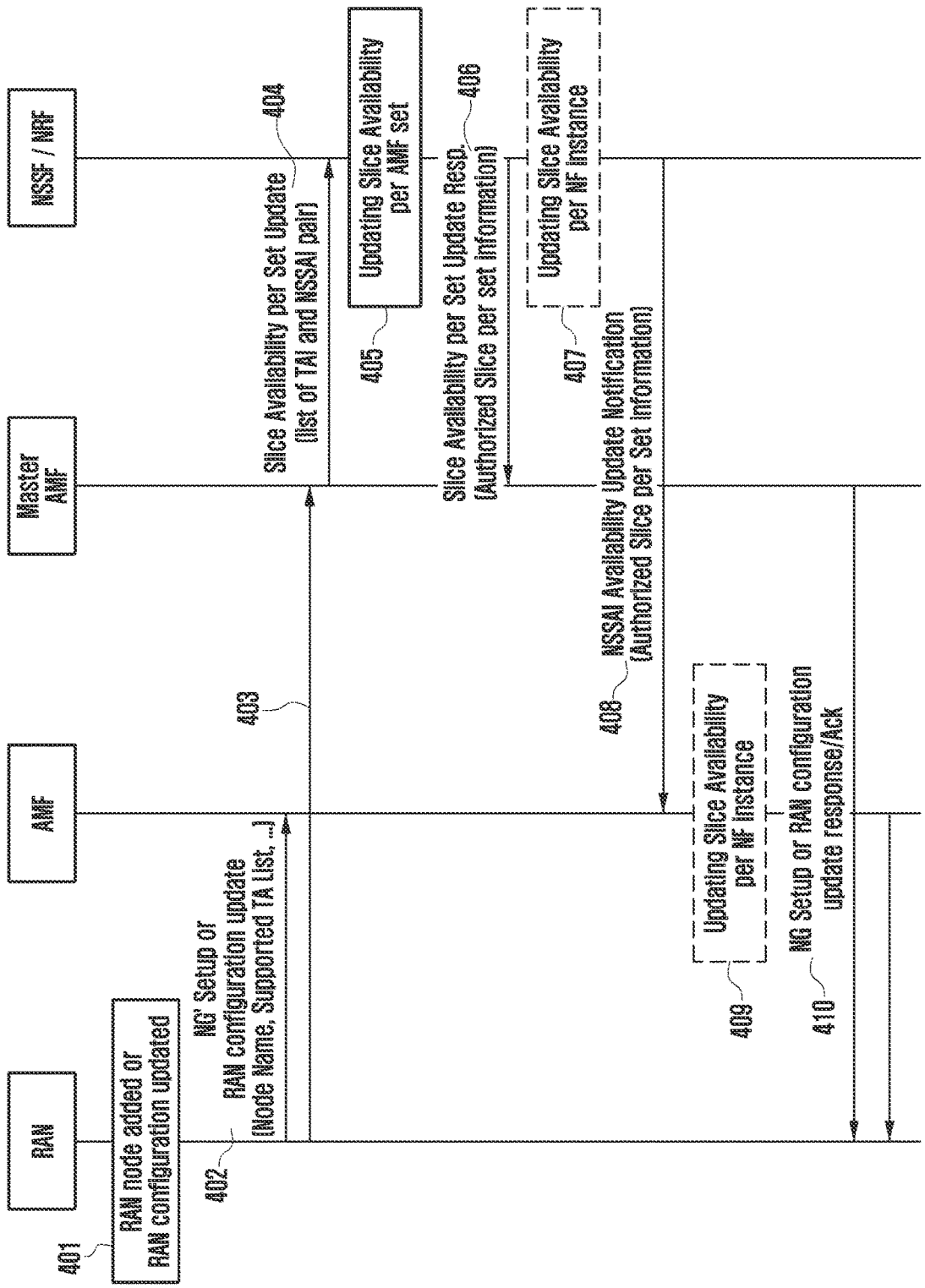
FIG. 4A is a diagram illustrating an overall method for managing slice information in units of sets according to an embodiment of the disclosure.
Figure 4B:
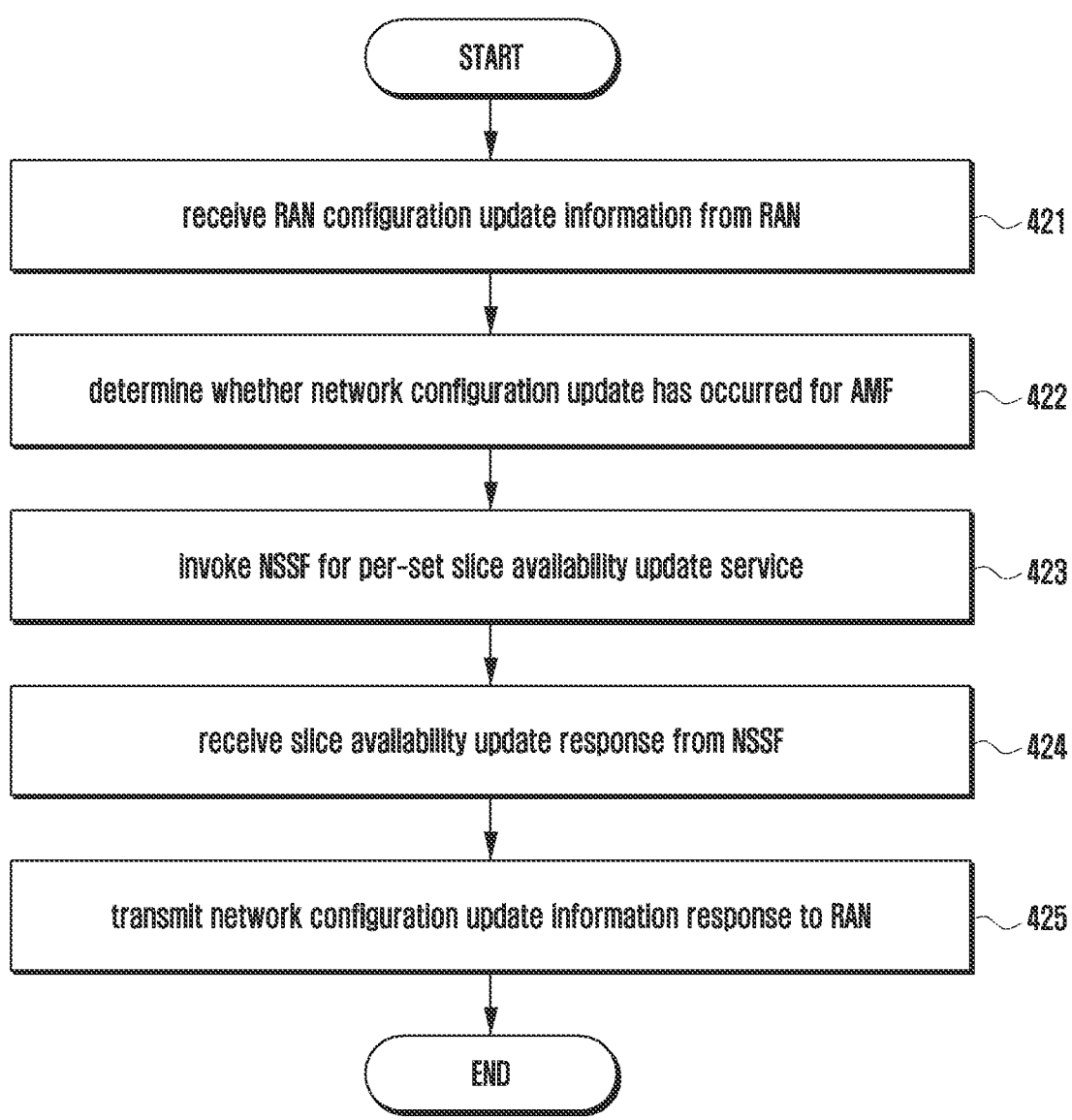
FIG. 4B is a diagram illustrating a method for a master access and mobility management function (AMF) to manage slice information in units of sets according to an embodiment of the disclosure.

FIGS. 4A and 4B are diagrams illustrating a method for managing slice information in units of sets according to various embodiments of the disclosure.

FIG. 4A is a diagram illustrating an overall process of managing slice information in units of sets according to the disclosure.

Referring to FIG. 4A, a base station may be newly added or may start to operate, or the configuration of the base station, that is, the tracking area (TA) or a NW slice (logical network identified by S-NSSAI) supported by the base station may be added or updated at operation 401.

The base station may perform an NG setup procedure if a new relationship and connection for network configuration and management with the connected AMF and master AMF is required, or may perform a RAN configuration update procedure if there is an existing connection at operations 402, 403. Here, the request message sent by the base station may include the name and identifier of the base station and a list of TAs supported by the base station, and the TA list may include, for each TA, one or more S-NSSAIs supported in the TA.

The master AMF may determine whether to consider addition or update of network slice and TA information for the AMF set in the slice selection process according to the information received from the base station. If the network configuration for slice selection is updated, the master AMF may invoke the NSSF (which can be replaced with another NF like the NRF or SCP that manages and finds network state information) for a service of NSSAI availability update in units of sets at operation 404. The service request may include the NSSAI availability information per set described above.

The NSSF may update or add information about a slice to be applied to the set and an area (TA) where the slice is supported if necessary to update it according to the request from the master AMF at operation 405. Here, the data stored by the NSSF may be identified by using the identity (ID) of the AMF set having made the request. The NSSF may determine the time of application for the updated NSSAI availability per set.

The NSSF transmits a response for the request from the master AMF, in which case when the slice information (e.g., AuthorizedNssaiAvailability) allowed to be used by the AMF set is updated or added, this may also be notified at operation 406. Here, to match the application time of the availability updated at operation 405 with other AMFs, the NSSF may transmit the corresponding time information as a portion of the response to the master AMF. Upon receiving the time information, the master AMF operates with application of the updated information from the time point when the corresponding time condition is satisfied.

The NSSF may also update the NSSAI available information of other AMF instances belonging to the AMF set requested from the master AMF at operation 407. For example, the NSSF may find an AMF set for the slice information received from the master AMF, find AMF instances belonging to the set, and update the NSSAI available information identified by the instance IDs of the AMF instances together.

The NSSF may notify the NSSAI availability information per set to other AMF instances belonging to the AMF set at operation 408. For example, when AuthorizedNssaiAvailability per set is updated or added, the NSSF may transmit a message for notifying this to each AMF instance. This can be performed by using the NSSAI availability update notification service. Here, to match the application time of the updated availability with other AMF instances, the NSSF may transmit the corresponding time information as a portion of the message to the AMF. Upon receiving the time information, the AMF operates with application of the updated information from the time point when the corresponding time condition is satisfied.

Each AMF instance may separately update its own NSSAI available information by using the authorized slice information per set received from the NSSF at operation 409.

The AMFs including the master AMF transmit a response for the request message from the base station, in which case configuration information of the AMF may be included in the response at operation 410. If the network configuration supported by the AMF (TA, supported NSSA, PLMN, or the like) is updated in the NSSF, the AMF may notify this to the base station through the response message.

FIG. 4B is a diagram illustrating operations of the master AMF according to a time series flow in relation to the embodiment described in FIG. 4A according to an embodiment of the disclosure.

Referring to FIG. 4B, when a new relationship and connection is generated for the configuration and management of the AMF, the master AMF may receive a RAN configuration information update request message from the base station for requesting an NG setup procedure or RAN configuration update at operation 421.

The master AMF may determine whether a network configuration update, such as adding or changing network slice and TA information, has occurred for the AMF set based on the RAN configuration update information message received from the base station at operation 422.

If the network configuration for slice selection is updated, the master AMF may transmit the NSSF (which can be replaced with another NF like the NRF or SCP that manages and finds network state information) an update request message for NSSAI availability update in units of sets to receive a slice service under the network configuration updated by reflecting the above network configuration update at operation 423.

Thereafter, the NSSF updates or adds network configuration update information by using the AMF set identifier included in the per-set update request message from the master AMF and transmits a response for the update request to the master AMF, and the master AMF may receive it at operation 424.

The master AMF may transmit a response including AMF configuration information to the base station according to the slice information updated in units of sets at operation 425. Update information of the network configuration (TA, supported NSSAI, PLMN, or the like) supported by the AMF may be transmitted to the base station through this.

Figure 5:
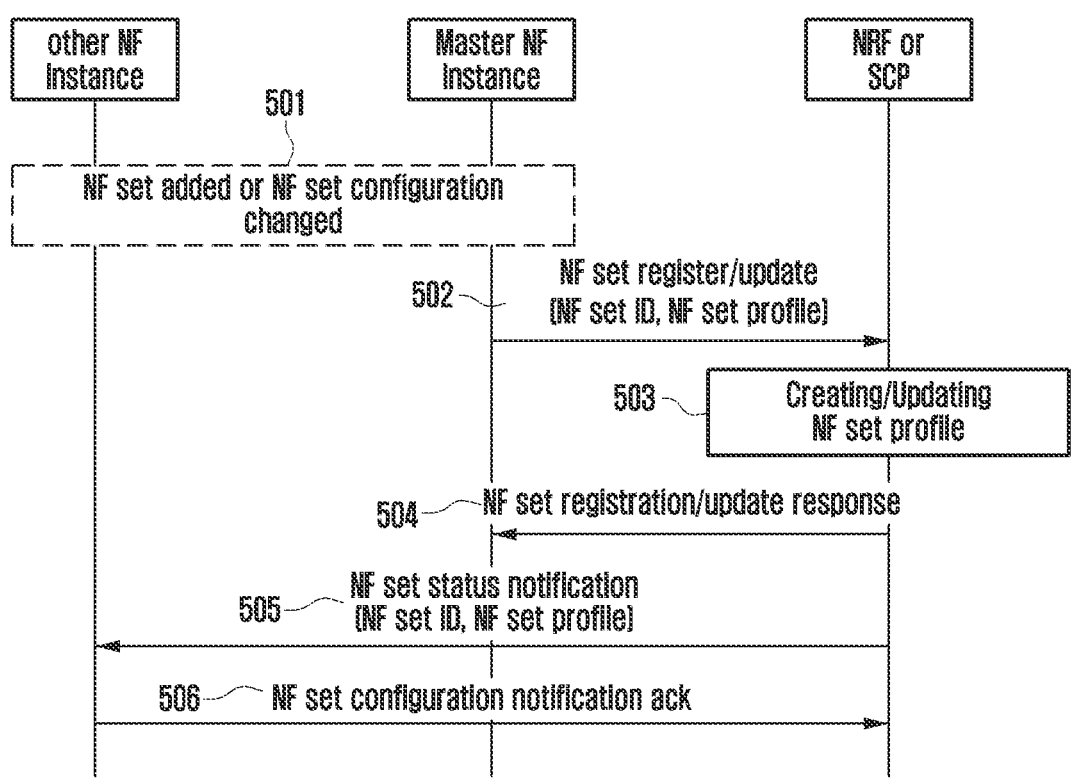
FIG. 5 is a diagram illustrating a method for managing a profile in units of network function (NF) sets according to an embodiment of the disclosure.

FIG. 5 is a diagram illustrating a method for managing a profile in units of NF sets according to an embodiment of the disclosure.

In this embodiment of the disclosure, the management of the NF set profile may be performed by the master NF (or, default AMF) belonging to the NF set. One of the NFs belonging to the NF set may be selected as the master NF, where a designated NF instance may be set to play the master role, or NF instances may be selected alternately in a round robin fashion to play the master role. Here, information may be exchanged between the NF instances to notify that only one NF instance operates as the master in the NF set at a specific time.

Referring to FIG. 5, an NF set may be newly created or added, or configuration information of an NF set may be updated at operation 501. Here, the configuration information of an NF set may include a set of parameters or attributes that are shared by all NF instances belonging to the NF set and applied in common.

The master NF may perform a process for registering the profile of the NF set to which it belongs with the NRF (or SCP) at operation 502. Here, an NF register or NF set register service can be invoked, and the service request may include the identifier (ID) of the NF set to be registered and NF set profile. The NF set profile may include identifiers of NF instances belonging to the NF set.

The NRF may use the received information to store the profile of the NF set and generate resources for this at operation 503. Thereafter, the resource for the NF set profile can be identified by the NF set ID.

The NRF transmits a response for the request to the master NF at operation 504.

The NRF may deliver the NF set profile to other NF instances belonging to the NF set to notify the created/updated set profile at operation 505. Here, the NRF may use an NF status notify or NF set status notify service.

Those NF instances having received a notification from the NRF may transmit an acknowledgment for the notification to the NRF at operation 506.

Figure 6:
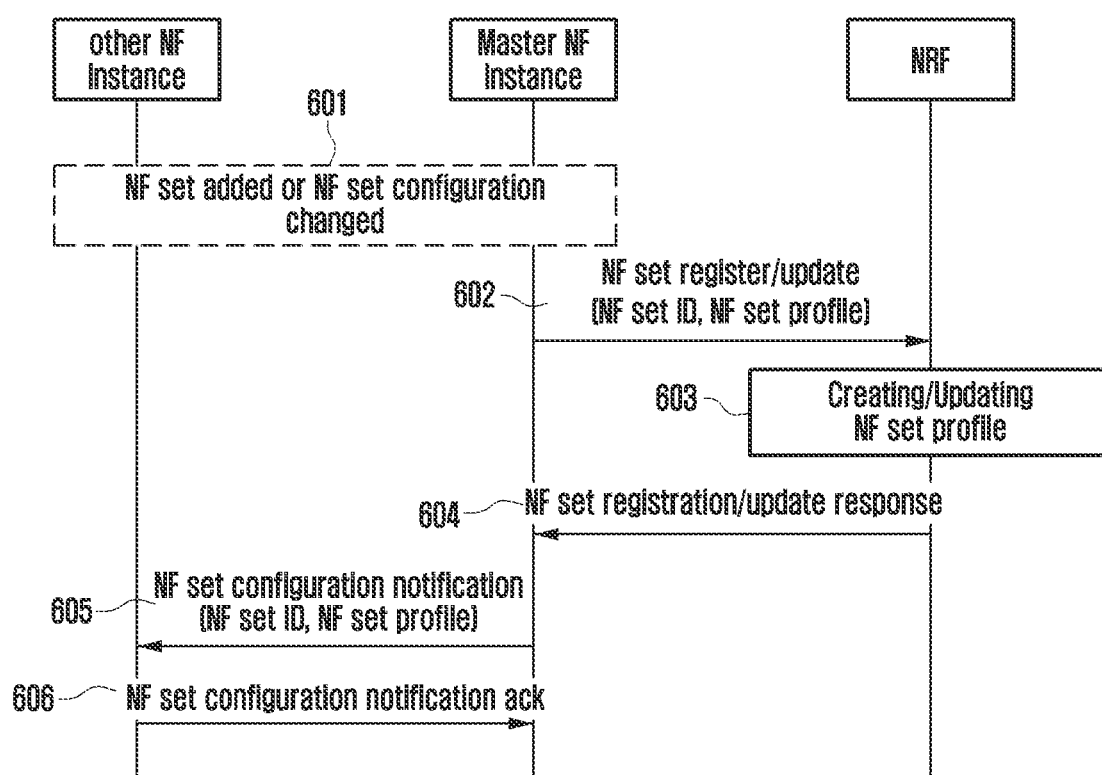
FIG. 6 is a diagram illustrating a method for creating or adding an NF set, or updating configuration information of the NF set according to an embodiment of the disclosure.

FIG. 6 is a diagram illustrating a method for creating or adding an NF set, or updating configuration information of the NF set according to an embodiment of the disclosure.

Referring to FIG. 6, an NF set may be newly created or added, or configuration information of an NF set may be updated at operation 601. Here, the configuration information of an NF set may include a set of parameters or attributes that are shared by all NF instances belonging to the NF set and applied in common.

The master NF may perform a process for registering the profile of the NF set to which it belongs with the NRF (or, SCP) at operation 602. Here, an NF register or NF set register service can be invoked, and the service request may include the identifier (ID) of the NF set to be registered and NF set profile. The NF set profile may include identifiers of NF instances belonging to the NF set.

The NRF may use the received information to store the profile of the NF set and generate resources for this at operation 603. Thereafter, the resource for the NF set profile can be identified by the NF set ID.

The NRF transmits a response for the request to the master NF at operation 604.

If the registration of the NF set profile is successful, the master NF may transmit the NF set profile to other NF instances to notify the created/updated set profile at operation 605. Here, the master NF may use an NF status notify or NF set status notify service or a heartbeat service.

Those NF instances having received a notification from the master NF transmit an acknowledgment for the notification to the master NF at operation 606.

Figure 7:
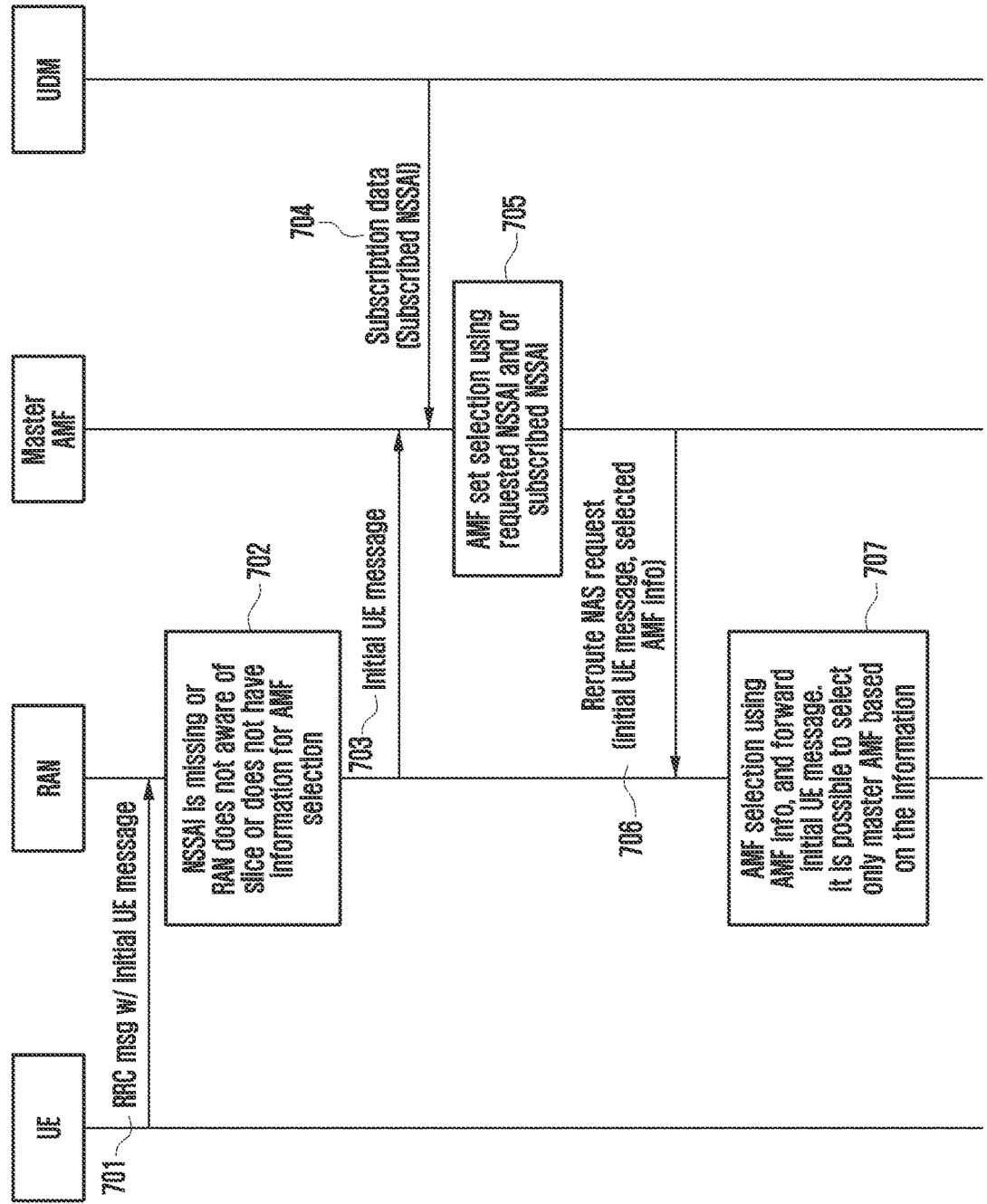
FIG. 7 is a diagram illustrating an AMF selection process using a master AMF according to an embodiment of the disclosure.

FIG. 7 is a diagram illustrating an AMF selection process using a master AMF. The role and selection scheme of the master AMF are the same as those disclosed in FIGS. 3 and 4 according to an embodiment of the disclosure.

Referring to FIG. 7, the terminal may transmit an RRC message containing a NAS message for registration to the base station at operation 701. Here, the terminal may include slice information (NSSAI) to be accessed by it as an AS layer parameter.

The base station may determine whether it is possible to perform AMF selection by using the identifier (ID) used by the terminal, slice information, and configured information. If the base station cannot perform AMF selection using the slice information or AS layer slice information is not included in the message received from the terminal at operation 702, the base station selects the master (or default) AMF and forwards the initial UE message received from the terminal to the master AMF at operation 703.

The master AMF may receive subscription information from the UDM if necessary, in which case slice information and subscribed S-NSSAIs applicable to the subscriber may be received at operation 704. If the terminal includes selected slice information (requested NSSAI) in the NAS layer, the master AMF may take this into account and selects an AMF based on the subscription information received from the UDM at operation 705. If the master AMF can provide a service to the terminal, it performs the remaining portion of the registration process. If another AMF is selected, the master AMF transmits the base station a reroute NAS message including information for identifying the selected AMF (AMF information, AMF set information, or other master AMF information) and an initial UE message (registration request) received from the terminal at operation 706.

The base station may select again an AMF to which the request of the terminal is to be transmitted by using the information received from the master AMF at operation 707. If an AMF is designated and interworking with the designated AMF is possible, the base station may select the designated AMF. If AMF set information is received, one AMF can be selected from the corresponding AMF set. If another master AMF information is received, the base station may select the corresponding master AMF and transmit a message thereto.

Figure 8:
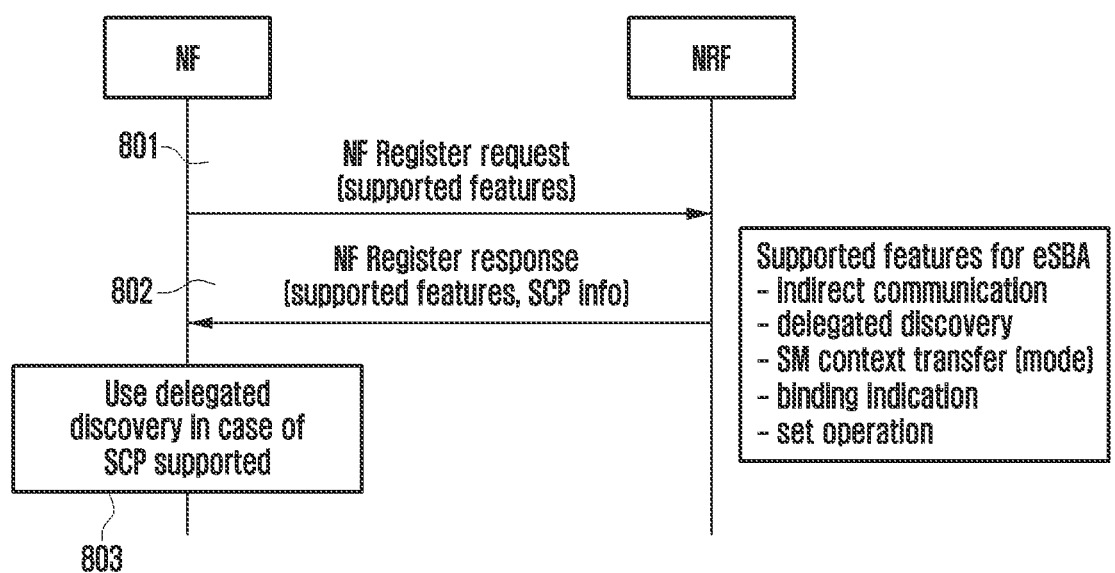
FIG. 8 is a diagram illustrating an NF registration process according to an embodiment of the disclosure.

FIG. 8 is a diagram illustrating an NF registration process according to an embodiment of the disclosure.

Referring to FIG. 8, an NF of the network may transmit an NF registration request message to the NRF to perform an NF register process for registering its information at operation 801. Here, the request message transmitted by the NF may include the profile of the NF, and may also include information about supported features indicating functions supported by the NF. In particular, indications of whether indirect communication, delegated discovery, SM context transfer, binding indication, and NF set are supported as enhancements to the SBA, among the functions supported by the NF, may be included. Information about the supported features may be included as a portion of the NF profile, or may be separated from the NF profile and included in the request message as separate data.

The NRF transmits a response message for the request of the NF at operation 802, in which case the response message may include supported features available in the network where the NF is currently registered. The contents and message composition that may be included in the supported features may be the same as those of the supported features included in the request message. In addition, the response of the NRF may additionally include information to be applied when the NF uses the SCP in the network. The SCP information may include the address of the SCP, the operation mode of the SCP (one of modes A, B, C and D), whether indirect communication is used, and whether delegated discovery is used.

The NF stores the information received from the NRF, and performs subsequent operations by using the received information (whether the SCP, indirect communication, or delegated discovery is used) at operation 803.

Figure 9:
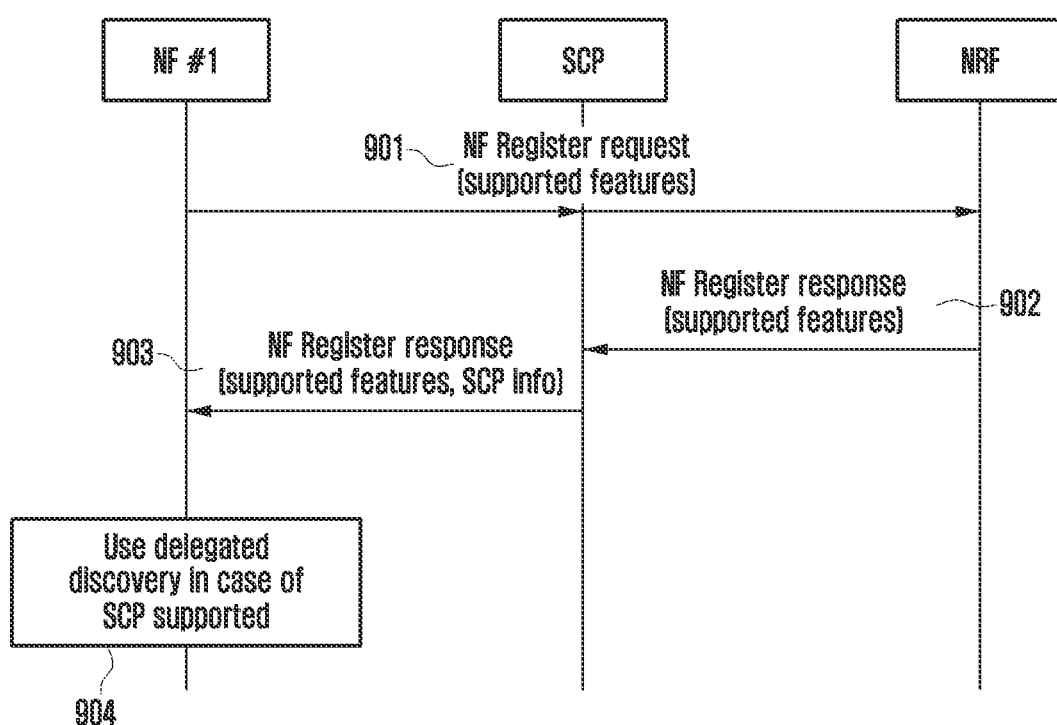
FIG. 9 is a diagram illustrating an NF registration process according to an embodiment of the disclosure.

FIG. 9 is a diagram illustrating an NF registration process according to an embodiment of the disclosure.

With reference to FIG. 9, an NF of the network may transmit an NF registration request message to the NRF to perform an NF register process for registering its information at operation 901. Here, the request message transmitted by the NF may include the profile of the NF, and may also include information about supported features indicating functions supported by the NF. In particular, indications of whether indirect communication, delegated discovery, SM context transfer, binding indication, and NF set are supported as enhancements to the SBA, among the functions supported by the NF, may be included. Information about the supported features may be included as a portion of the NF profile, or may be separated from the NF profile and included in the request message as separate data. In this case, the SCP can play a role of receiving and forwarding messages between the NF and the NRF. For example, the SCP may receive a registration request message from the NF and forward it to the NRF.

The NRF transmits a response for the request of the NF at operation 902, in which case the response message may include supported features available in the network where the NF is currently registered. The contents and message composition that may be included in the supported features may be the same as those of the supported features included in the request message.

The response message transmitted by the NRF is first received by the SCP, and the SCP may include SCP operation information in the response message before forwarding at operation 903. The SCP information may include the address of the SCP, the operation mode of the SCP (one of modes A, B, C and D), whether indirect communication is used, and whether delegated discovery is used. The SCP may transmit the NF a response message including the above information in addition to the information received from the NRF.

The NF stores the information received from the NRF (and the SCP), and may perform subsequent operations by using the received information (whether the SCP, indirect communication, or delegated discovery is used) at operation 904.

Figure 10:
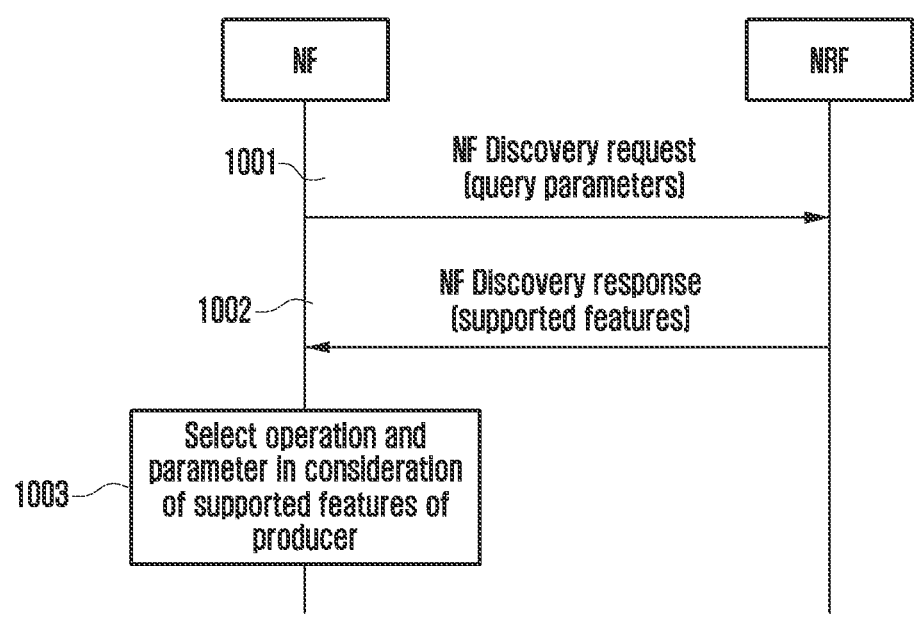
FIG. 10 is a diagram illustrating an NF registration process according to an embodiment of the disclosure.

FIG. 10 is a diagram illustrating an NF registration process according to an embodiment of the disclosure.

Referring to FIG. 10, one NF of the network may transmit a discovery request message to the NRF to find or select another NF or receive information thereof at operation 1001. Here, the request message transmitted by the NF may include information related to the target to be found. To discover a desired NF, the NF may include indications of whether indirect communication, delegated discovery, SM context transfer, binding indication, and NF set are supported as enhancements to the SBA in the request message as query parameters.

The NRF searches for a candidate NF that satisfies the condition for the request of the NF and transmits a response at operation 1002. The response message may include information about candidate NFs that the requesting NF can select and supported features of the candidate NFs. The response of the NRF may additionally include information to be applied when the requesting NF uses the SCP in the network to communicate with the candidate NFs. The SCP information may include the address of the SCP, the operation mode of the SCP (one of modes A, B, C and D), whether indirect communication is used, and whether delegated discovery is used.

The NF stores the information received from the NRF, and may perform subsequent operations by using the received information (information about candidate NFs, whether the SCP, indirect communication, or delegated discovery is used) at operation 1003.

Figure 11:
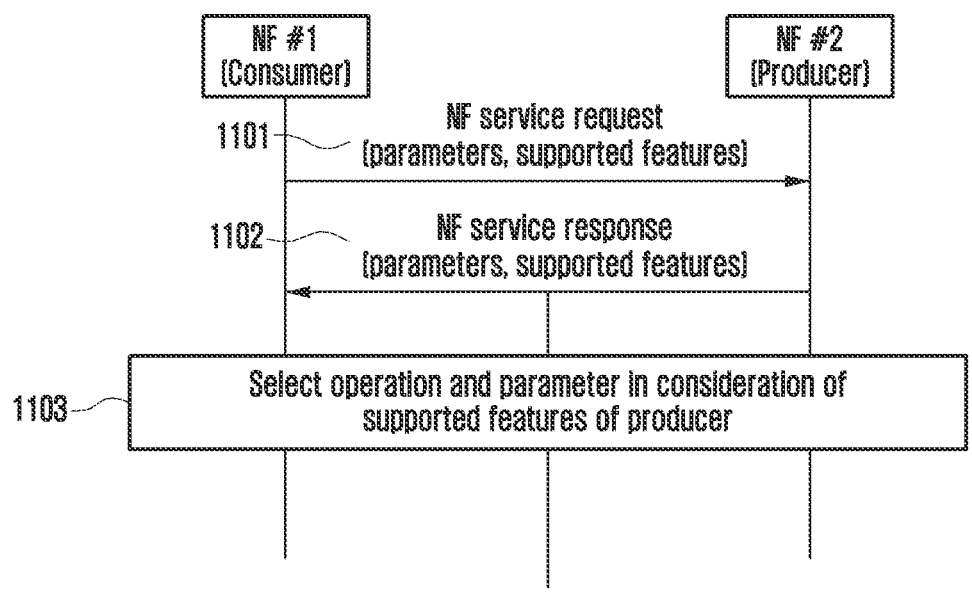
FIG. 11 is a diagram illustrating an NF registration process according to an embodiment of the disclosure.

FIG. 11 is a diagram illustrating an NF registration process according to an embodiment of the disclosure.

Referring to FIG. 11, one NF of the network (operating as a consumer NF) may transmit a request message for a specific service to another NF (operating as a producer NF) at operation 1101. Here, the request message transmitted by the consumer NF may include parameters for performing the corresponding service and information on the supported features of the consumer NF. The information on the supported features may include indications of whether indirect communication, delegated discovery, SM context transfer, binding indication, and NF set are supported particularly as enhancements to the SBA, among the functions supported by the consumer NF. The supported features may be included as one of service request parameters, or may be separated and included in the request message as separate data.

The producer NF may process the service request from the consumer NF and transmit a response message corresponding thereto at operation 1102. Here, the response message transmitted by the producer NF may include parameters for the result of performing the corresponding service and information on the supported features of the producer NF. The information on the supported features may include indications of whether indirect communication, delegated discovery, SM context transfer, binding indication, and NF set are supported particularly as enhancements to the SBA, among the functions supported by the producer NF. The supported features may be included as one of service result parameters, or may be separated and included in the response message as separate data.

The consumer NF and the producer NF may store the information exchanged therebetween, and may perform subsequent operations by using the received information (information on peer NFs, whether the SCP, indirect communication, or delegated discovery is used) at operation 1103.

Figure 12:
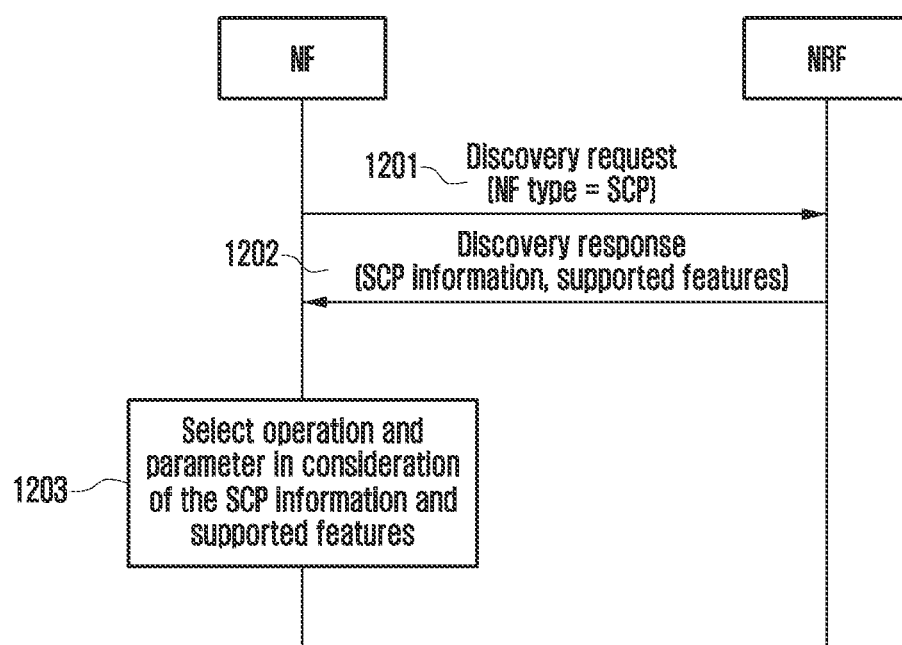
FIG. 12 is a diagram illustrating a method for an NF to receive service communication proxy (SCP) information through an NRF according to an embodiment of the disclosure.

FIG. 12 is a diagram illustrating a method for an NF to receive SCP information through an NRF according to an embodiment of the disclosure.

Referring to FIG. 12, one NF of the network (which can operate as a consumer NF or a producer NF) may transmit a discovery request message to the NRF to receive information for using the SCP in the configuration of the network at operation 1201. Here, the request message transmitted by the NF may include a parameter indicating that the target of discovery is an SCP and information on supported features of the NF. The information on the supported features may include indications of whether indirect communication, delegated discovery, SM context transfer, binding indication, and NF set are supported, particularly as enhancements to the SBA, among the functions supported by the NF. The supported features may be included as one of service request parameters, or may be separated and included in the request message as separate data. In addition, when the requesting NF needs to receive SCP information for a specific NW slice, it may include the identifier of the target slice in the request message. The above request may be a regular NF discovery request, a SCP discovery request for the SCP only, or a request for receiving message delivery/routing information.

The NRF may search for a SCP that satisfies the condition for the request of the NF and transmit a response message at operation 1202. The response message may include information about the SCP that the requesting NF can use (SCP address, NF ID, identifiers of slices supported by the SCP, connection relationship between the SCP and other SCPs, or the like) and supported features of the SCP. The response of the NRF may additionally include information to be applied when the requesting NF uses the SCP in the network to communicate with other NFs. This may include the operation mode of the SCP (one of modes A, B, C and D), whether indirect communication is used, and whether delegated discovery is used. If there is no SCP that satisfies the request of the NF, the NRF may explicitly notify this to the NF through the response message. The above response is a response for the request message from the NF, that is, a response corresponding to a regular NF discovery request, a SCP discovery request for the SCP only, or a request for receiving message delivery/routing information. If the connection between the NF and the SCP is composed of multiple hops in the network configuration, the discovery response may include information about the next-hop NF (or SCP) only from the viewpoint of the discovery requesting NF (or SCP), or may include information about all NFs (or SCPs) along the hop sequence on the transmission path.

The NF may store the information received from the NRF, and may perform subsequent operations by using the received information (whether the SCP is used, SCP address, NF ID, whether indirect communication or delegated discovery is used, or the like) at operation 1203. If the received response message contains information that there is no SCP or does not contain SCP information, the NF may assume that there is no SCP for subsequent operations.

Figure 13:
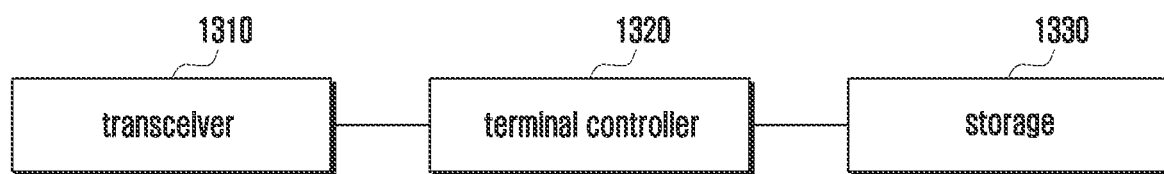
FIG. 13 is a diagram illustrating a terminal equipment according to an embodiment of the disclosure.

FIG. 13 is a block diagram of a terminal according to an embodiment of the disclosure.

Referring to FIG. 13, the terminal may include a transceiver 1310, a terminal controller 1320, and a storage 1330. In the disclosure, the terminal controller 1320 may be defined as a circuit, an application-specific integrated circuit, or at least one processor.

The transceiver 1310 may transmit and receive signals to and from another network entity. The transceiver may receive system information, a synchronization signal, or a reference signal from, for example, a base station.

The terminal controller 1320 may control the overall operation of the terminal according to an embodiment proposed in the disclosure. For example, the terminal controller may control signal flows between blocks to perform operations according to the above-described drawings and flowcharts. Specifically, the terminal controller may operate according to a control signal from the base station and may exchange messages or signals with another terminal and/or network entity.

The storage 1330 may store at least one of information transmitted and received through the transceiver 1310 or information generated through the terminal controller.

Figure 14:
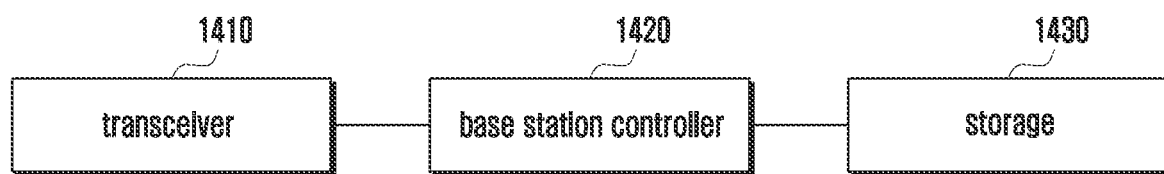
FIG. 14 is a diagram illustrating a base station equipment according to an embodiment of the disclosure.

FIG. 14 is a block diagram of a base station according to an embodiment of the disclosure.

Referring to FIG. 14, the base station may include a transceiver 1410, a base station controller 1420, and a storage 1430. In the disclosure, the base station controller 1420 may be defined as a circuit, an application-specific integrated circuit, or at least one processor.

The transceiver 1410 may transmit and receive signals to and from another network entity. The transceiver may transmit system information, a synchronization signal, or a reference signal to, for example, a terminal, and may receive information from an NF to provide a service to the terminal.

The base station controller 1420 may control the overall operation of the base station according to an embodiment proposed in the disclosure. For example, the base station controller may control signal flows between individual blocks to perform operations according to the above-described drawings and flowcharts. Specifically, the base station controller may exchange messages or signals with a terminal, another base station and/or network entity.

The storage 1430 may store at least one of information transmitted and received through the transceiver or information generated through the base station controller.

Figure 15:
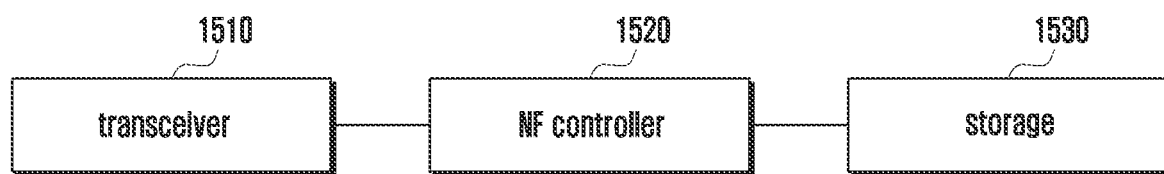
FIG. 15 is a diagram illustrating an NF entity according to an embodiment of the disclosure.

FIG. 15 is a block diagram of an NF (including an NF instance) according to an embodiment of the disclosure.

The NF shown in FIG. 15 may include at least one of the AMF, master AMF, NSSF, SCP, or NRF described above, and is not limited to a specific NF.

Referring to FIG. 15, the NF may include a transceiver 1510, an NF controller 1520, and a storage 1530.

The transceiver 1510 may transmit and receive signals to and from another network entity. The transceiver may transmit data and control information for providing a service to a base station (RAN), and may transmit information according to the disclosure to another NF.

The NF controller 1520 may control the overall operation of the NF according to an embodiment proposed in the disclosure.

The storage 1530 may store at least one of information transmitted and received through the transceiver or information generated through the NF controller.

The methods according to the embodiments described in the claims or specification of the disclosure may be implemented in the form of hardware, software, or a combination thereof.

When implemented in software, a computer-readable storage medium storing one or more programs (software modules) may be provided. The one or more programs stored in the computer-readable storage medium are configured to be executable by one or more processors of an electronic device. The one or more programs include instructions that cause the electronic device to execute the methods according to the embodiments described in the claims or specification of the disclosure.

Such a program (software module, software) may be stored in a random access memory, a nonvolatile memory, such as a flash memory, a read only memory (ROM), an electrically erasable programmable read only memory (EEPROM), a magnetic disc storage device, a compact disc ROM (CD-ROM), a digital versatile disc (DVD), other types of optical storage devices, or a magnetic cassette. Or, such a program may be stored in a memory composed of a combination of some or all of them. In addition, a plurality of component memories may be included.

In addition, such a program may be stored in an attachable storage device that can be accessed through a communication network, such as the Internet, an intranet, a local area network (LAN), a wide area network (WAN), or a storage area network (SAN), or a communication network composed of a combination of these. Such a storage device may access the device that carries out an embodiment of the disclosure through an external port. In addition, a separate storage device on a communication network may access the device that carries out an embodiment of the disclosure.

While the disclosure has been shown and described with reference to various embodiments thereof, it will be understood by those skilled in the art that various changes in form and details may be made therein without departing from the spirit and scope of the disclosure as defined in the appended claims and their equivalents.

What is claimed is:

1. A method performed by a service communication proxy (SCP) entity in a wireless communication system, the method comprising:
    transmitting, to a network repository function (NRF) entity, a network function (NF) discovery request message including a parameter indicating a type of a target NF to be discovered is an SCP; and
    in response to the NF discovery request message, receiving, from the NRF entity, an NF discovery response message including information associated with the target NF.

2. The method of claim 1, wherein the discovery request message further includes at least one of NF set information associated with an NF entity served by the target NF or a network slice related identifier associated with the target NF.

3. The method of claim 1, wherein the information includes the type of the target NF, an NF identifier of the target NF, and an address of the target NF.

4. The method of claim 3, wherein the information includes at least one of a network slice related identifier associated with the target NF, or SCP domain information associated with another SCP entity interconnected with the target NF.

5. The method of claim 3, based on the type of the target NF being SCP, the information further includes at least one of NF set information associated with an NF entity served by the target NF, or endpoint addresses accessible via the target NF.

6. A service communication proxy (SCP) entity in a wireless communication system, the SCP entity comprising:
a transceiver; and
a controller coupled with the transceiver and configured to:
transmit, to a network repository function (NRF) entity, a network function (NF) discovery request message including a parameter indicating a type of a target NF to be discovered is an SCP, and
in response to the NF discovery request message, receive, from the NRF entity, an NF discovery response message including information associated with the target NF.

7. The SCP entity of claim 6, wherein the discovery request message further includes at least one of NF set information associated with an NF entity served by the target NF or a network slice related identifier associated with the target NF.

8. The SCP entity of claim 6, wherein the information includes the type of the target NF, an NF identifier of the target NF, and an address of the target NF.

9. The SCP entity of claim 8, wherein the information includes at least one of a network slice related identifier associated with the target NF, or SCP domain information associated with another SCP entity interconnected with the target NF.

10. The SCP entity of claim 8, based on the type of the target NF being SCP, the information further includes at least one of NF set information associated with an NF entity served by the target NF, or endpoint addresses accessible via the target NF.

11. A method performed by a network repository function (NRF) entity in a wireless communication system, the method comprising:
receiving, from a service communication proxy (SCP) entity, a network function (NF) discovery request message including a parameter indicating a type of a target NF to be discovered is an SCP; and
in response to the NF discovery request message, transmitting, to the SCP entity, an NF discovery response message including information associated with the target NF.

12. The method of claim 11, wherein the discovery request message further includes at least one of NF set information associated with an NF entity served by the target NF or a network slice related identifier associated with the target NF.

13. The method of claim 11, wherein the information includes the type of the target NF, an NF identifier of the target NF, and an address of the target NF.

14. The method of claim 13, wherein the information includes at least one of a network slice related identifier associated with the target NF, or SCP domain information associated with another SCP entity interconnected with the target NF.

15. The method of claim 13, based on the type of the target NF being SCP, the information further includes at least one of NF set information associated with an NF entity served by the target NF, or endpoint addresses accessible via the target NF.

16. A network repository function (NRF) entity in a wireless communication system, the NRF entity comprising:
a transceiver; and
a controller coupled with the transceiver and configured to:
receive, from a service communication proxy (SCP) entity, a network function (NF) discovery request message including a parameter indicating a type of a target NF to be discovered is an SCP, and
in response to the NF discovery request message, transmit, to the SCP entity, an NF discovery response message including information associated with the target NF.

17. The NRF entity of claim 16, wherein the discovery request message further includes at least one of NF set information associated with an NF entity served by the target NF or a network slice related identifier associated with the target NF.

18. The NRF entity of claim 16, wherein the information includes the type of the target NF, an NF identifier of the target NF, and an address of the target NF.

19. The NRF entity of claim 18, wherein the information includes at least one of a network slice related identifier associated with the target NF, or SCP domain information associated with another SCP entity interconnected with the target NF.

20. The NRF entity of claim 18, based on the type of the target NF being SCP, the information further includes at least one of NF set information associated with an NF entity served by the target NF, or endpoint addresses accessible via the target NF.

* * * * *